COLOR SIGNAL DEMODULATOR

Filed April 6, 1967 3 Sheets-Sheet 2

Oct. 27, 1970 R. L. WEBER ET AL 3,536,825

COLOR SIGNAL DEMODULATOR

Filed April 6, 1967 3 Sheets-Sheet 3

United States Patent Office 3,536,825

Patented Oct. 27, 1970

3,536,825

COLOR SIGNAL DEMODULATOR

Roger L. Weber and Tzu T. Fu, Richardson, Tex., assignors to Texas Instruments Incorporated, Dallas, Tex., a corporation of Delaware Filed Apr. 6, 1967, Ser. No. 628,894

Int. Cl. H04n 9/50

U.S. Cl. 178—5.4 13 Claims

ABSTRACT OF THE DISCLOSURE

Apparatus is disclosed in which digital type switching elements and circuits are employed to demodulate a subcarrier signal, the phase of which represents hue and the amplitude of which represents saturation. To obtain the different color signals needed for a color display, a plurality of pulse controlled gates take amplitude samples of the subcarrier at respective phase angles which are determined relative to a phase reference signal having a predetermined phase relationship to the modulation of the subcarrier by the original color information.

Figure 1:
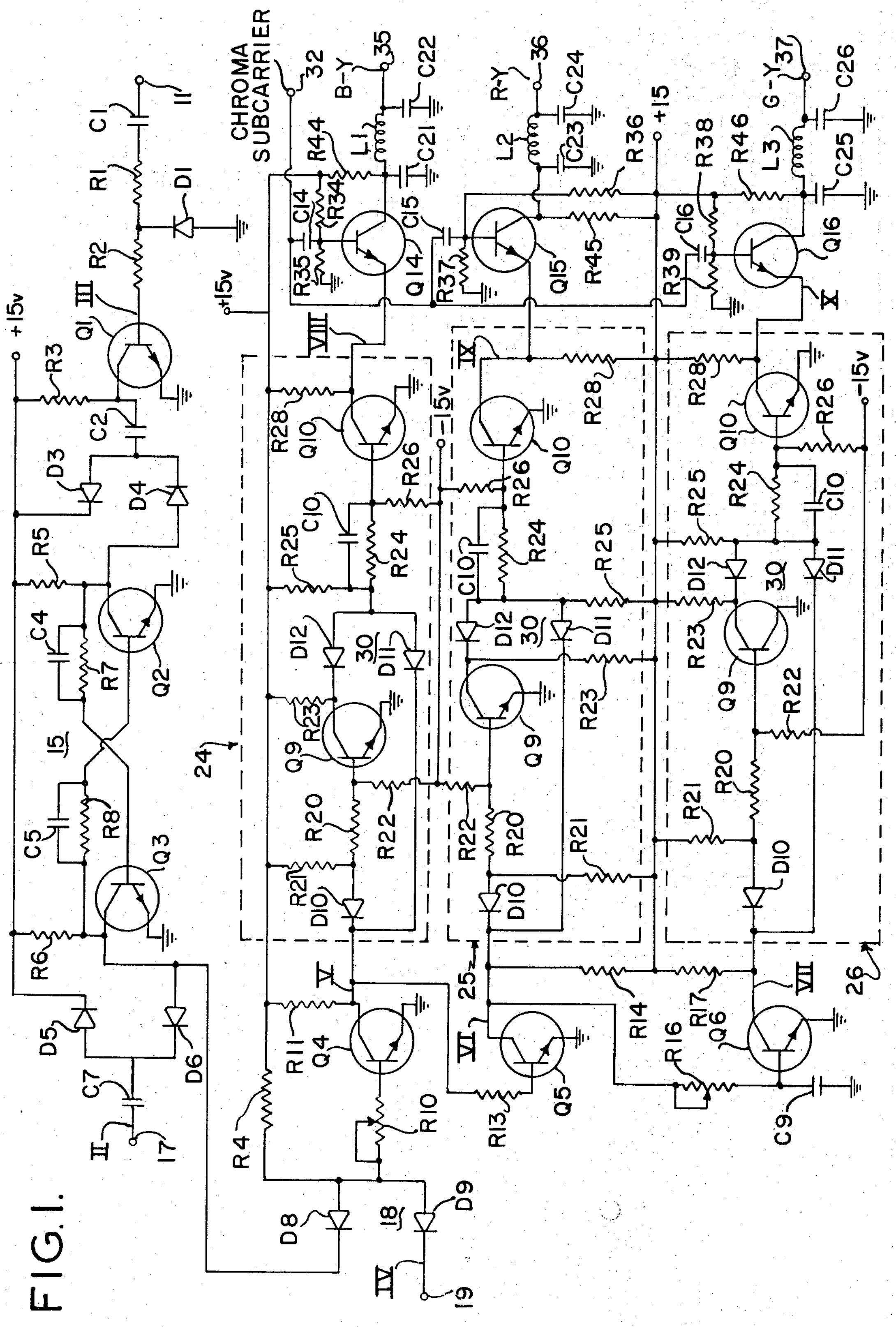

This invention relates to a color signal demodulator and more particularly to such a demodulator which is adapted for demodulating a subcarrier the phase of which represents hue and the amplitude of which represents saturation.

In the NTSC color transmitting system which is standard in this country, the transmitted signal represents successive lines of a scanning raster on a line-by-line basis. The color information is modulated on a 3.58 mHz. subcarrier by quadrature modulation so that, in the resultant signal, the phase of the subcarrier is representative of hue and the amplitude of the subcarrier is representative of saturation. This form of modulation may also be considered as comprising a dot-sequential presentation of three different component colors; red, green and blue. To demodulate or decode the transmitted color information, it is necessary to have an accurate time or phase reference basis against which the phase of the subcarrier may be compared during demodulation. For this purpose NTSC system transmissions include a color burst signal at the beginning of each line. The color burst comprises a few cycles of a 3.58 mHz. wave having a predetermined phase relationship to the quadrature color modulation.

In prior art demodulators, the subcarrier has typically been synchronously demodulated at two or more different phase angles, for example, by well-known product detector circuits. Synchronous detection or demodulation is obtained by providing to each of the product detectors a continuous phase reference signal in the form of a sine wave which is synchronized in phase with the color burst signal described previously. The output of the product detector is then generally representative of the amplitude of the subcarrier at a given phase angle, sampled or averaged over an interval of about 140° with respect to a cycle of the phase reference signal.

With such prior art demodulators, it has typically been necessary, in order to obtain satisfactory operation on transmissions of black and white signals, to provide a separate color killer circuit which cuts off the product detectors when no color burst signals are received.

Among the several objects of the present invention may be noted the provision of a color signal demodulator for obtaining color signals from a subcarrier, the phase of which represents hue and the amplitude of which represents saturation; the provision of such a demodulator which very accurately and precisely decodes the color information carried by the subcarrier; the provision of such a demodulator which employs digital type switching circuitry; the provision of such a demodulator which is readily miniaturized and can employ integrated circuits; the provision of such a demodulator in which the color signals are automatically cut off when no color burst signals are received; the provision of such a demodulator which is highly reliable; and the provision of such a demodulator which is relatively simple and inexpensive. Other objects and features will be in part apparent and in part pointed out hereinafter.

Briefly, a color signal demodulator according to the present invention is adapted for use in a color television receiver which operates in accordance with a received signal representing successive lines of a scanning raster. The received signal includes a subcarrier the phase of which represents hue and the amplitude of which represents saturation and includes also a color burst signal for each raster line. The demodulator includes means responsive to the color burst signal for providing a phase reference signal which is initiated by the color burst signal and is phase synchronized therewith and which ends after substantially one line period. The demodulator includes also gate means controlled by the phase reference signal for repeatedly sampling the subcarrier at each of a plurality of different preselected phase angles, determined with respect to the phase reference signal, thereby to provide a respective color signal for each of the preselected phase angles.

In another aspect of the invention, the demodulator includes a plurality of linear gates each of which, when open, is operative to pass a sample of the subcarrier signal. Means are provided for opening each of the gates at a respective predetermined phase angle within each cycle of the phase reference signal and for closing each of the gates after a predetermined delay following its opening, the delay being not substantially larger than one-tenth of the period of the phase reference signal thereby to obtain a very precise sample which is accurately representative of the subcarrier amplitude at that phase angle. The samples of the subcarrier signal taken by each of the gates are filtered thereby to provide respective color signals each of which represents a predetermined hue corresponding to the phase angle at which the respective samples were taken.

The invention accordingly comprises the constructions hereinafter described, the scope of the invention being indicated in the following claims.

In the accompanying drawings in which various possible embodiments of the invention are illustrated.

Figure 2:
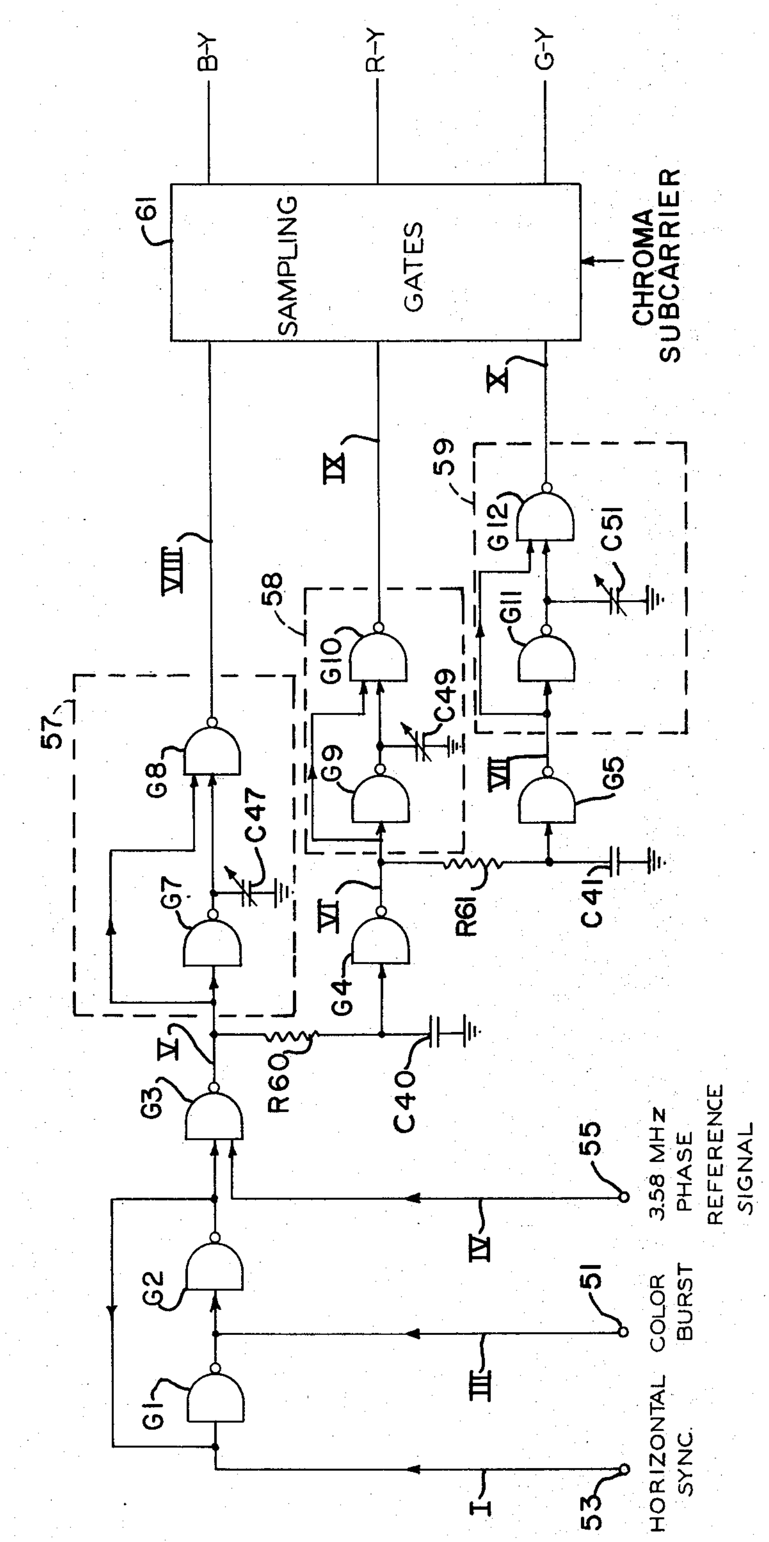
Figure 3:
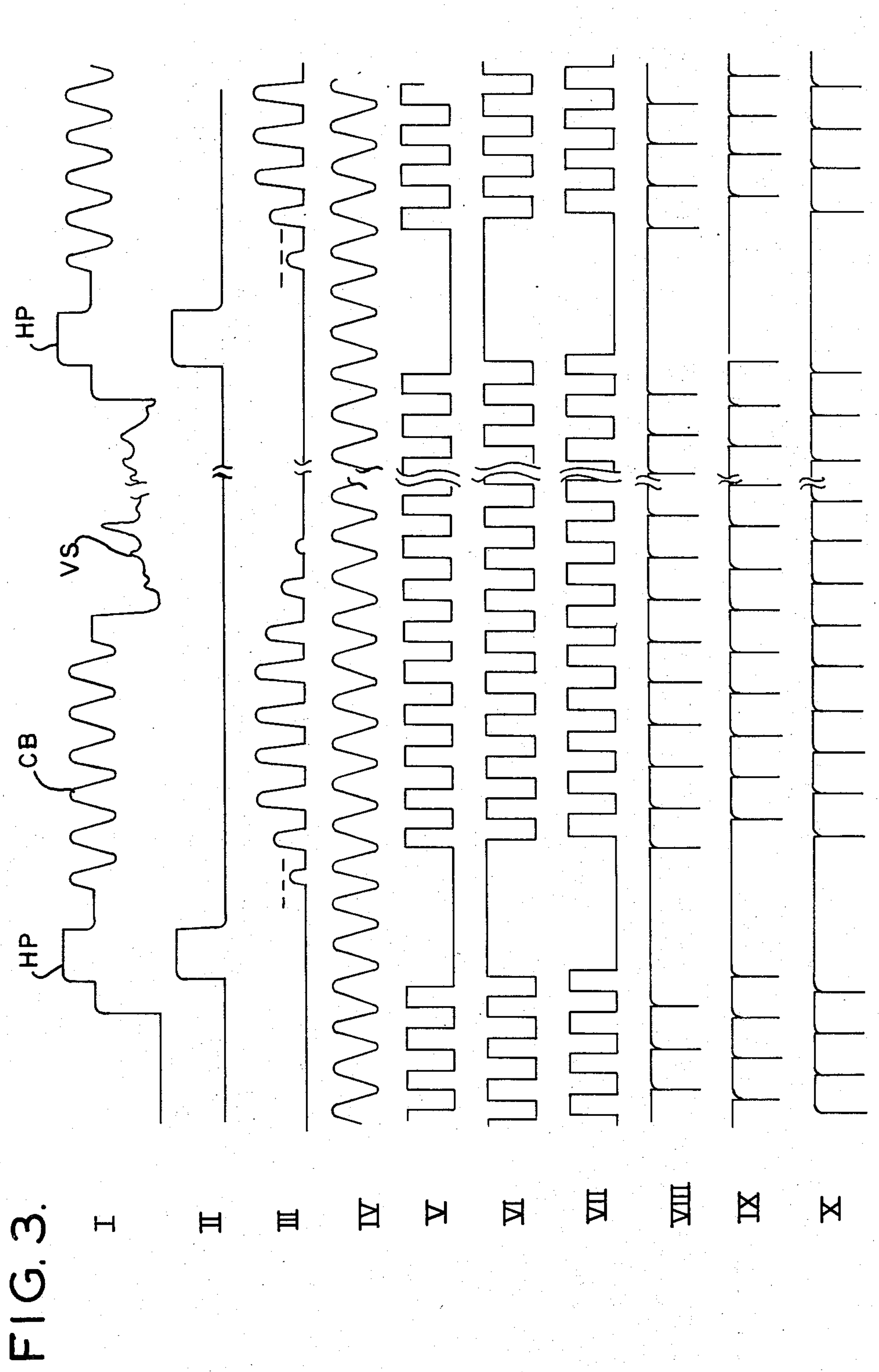

FIG. 1 is a schematic circuit diagram of a color signal demodulator according to the present invention;

FIG. 2 is a logic diagram of a color demodulator according to this invention, the elements of the demodulator being represented as conventional gate elements comprising digital switching circuits; and FIG. 3 is a graphical representation of waveforms occurring at various points in the circuits of FIGS. 1 and 2, the correspondence between the various waveforms and the points in the circuits at which they occur being indicated by the use of similar Roman numerals.

Corresponding reference characters indicate corresponding parts throughout the several views of the drawings.

Referring now to FIG. 1, it is assumed that the circuit shown is provided with the different supply voltages indicated at various points in the drawings. The circuit shown there is designed for operation in accordance with a received signal which represents successive lines of a scanning raster, transmitted according to NTSC standards. For reference, a representation (not to scale) of such an NTSC signal is shown at I in FIG. 3. The video signal VS representing each line is preceded by a color burst CB comprising a small number of cycles of a 3.58 mHz. sine wave having a predetermined phase relationship to the phase angles at which different color signals are quadrature modulated on the subcarrier as described previously. At the end of each line, that is, before the time of the next color burst, the NTSC signal includes a horizontal synchronizing pulse HP which aids in synchronizing the horizontal sweep of a scanning raster in displaying the received video information. Before being utilized in the apparatus illustrated, the color burst and the horizontal synchronizing pulse are filtered or separated from the rest of the NTSC signal by conventional means which form no part of the present invention and which are thus not described in detail herein.

The color burst signal is applied to a terminal 11 and is coupled, through a capacitor C1, to a network comprising a pair of resistors R1 and R2 and a diode D1. This network clips the color burst signal so that only the positive portions thereof are passed on as a positive pulse to the base of an NPN transistor Q1, as indicated at III in FIG. 3. The emitter of transistor Q1 is grounded and its collector is provided with a load resistor R3. The amplified pulse produced at the collector of transistor Q1 is applied, through a coupling capacitor C2 and a pair of gating diodes D3 and D4, to a flip-flop circuit which is indicated generally at 15 and which comprises a pair of NPN transistors Q2 and Q3. The emitters of transistors Q2 and Q3 are grounded and their collectors are provided with respective load resistors R5 and R6. The collector of transistor Q2 is coupled, by a network comprising a capacitor C4 and a resistor R7, to the base of transistor Q3 and the collector of transistor Q3 is coupled, by a network comprising a capacitor C5 and a resistor R8, to the base of transistor Q2. This cross coupling provides the bistable mode of operation characteristic of the flip-flop circuit. The pulse signal generated at the collector of transistor Q1 is applied to the collector of transistor Q2 and thus also, through capacitor C4, to the base of transistor Q3 for switching the flip-flop circuit 15 to a first one of its two stable states.

At 17 there is indicated a terminal to which are applied the horizontal synchronization pulses (II in FIG. 3). These pulses are coupled, through a capacitor C7 and a pair of gating diodes D5 and D6, to the collector of transistor Q3 for reversing the flip-flop circuit 15 to put it in the other of its two stable states.

The collector of transistor Q3 is also connected to one of the two inputs of a gate circuit 18 which comprises a pair of diodes D8 and D9. The other input of gate circuit 18 is constituted by a terminal 19 to which is applied a continuous phase reference signal. This continuous phase reference signal is, as indicated at IV in FIG. 3, a sine wave of the same frequency and phase as the color burst signal. Circuits for providing such a continuing phase reference signal, e.g., ringing circuits and phase locked oscillators, are well known in the art and, accordingly, are not described further herein. A digital clock whose operation is initiated by the color burst signal may also be used to provide a phase reference signal.

The output from gate circuit 18, taken from between diodes D8 and D9, is applied, through a rheostat R10, to the base of an NPN transistor Q4. Forward bias resistor R4 is connected to the anodes of diodes D8 and D9 and to the terminal of resistor R11. As is understood by those skilled in the art, the operation of the gate circuit 18 is such that, when the flip-flop circuit 15 is in its first state, i.e., following the occurrence of a color burst signal, the phase reference signal is passed by the gate and is applied to transistor Q4. However, when the flip-flop circuit 15 is in its other or opposite state, i.e., immediately following the occurrence of a horizontal synchronization pulse, the gate will be effectively closed and the phase reference signal will be cut off or blocked from the transistor Q4.

The emitter of transistor Q4 is grounded and its collector is provided with a load resistor R11. Transistor Q4 thus operates in a common-emitter mode and inverts the signal applied to its base terminal. The amplitude at which the phase reference singal is applied to terminal 19 is selected so that transistor Q4 is either saturated or cut off. This transistor thus operates in a switching mode and the waveform produced at its collector, during those periods when the gate circuit 18 is open, is a square wave having the same frequency and substantially the same phase as the sine-wave phase reference signal provided at terminal 19. The continuous phase reference signal applied to terminal 19 is thus gated and squared to provide, to the sampling circuits described hereinafter, a square-wave phase reference signal which is initiated by the color burst signal and which ends after substantially one line period. Such a signal is illustrated at V in FIG. 3.

The squared phase reference signal provided at the collector of transistor Q4 is applied, through a resistor R13, to the base of NPN transistor Q5. The emitter of transistor Q5 is grounded and its collector is provided with a load resistor R14. Transistor Q5 is thus operated in a common-emitter mode and inverts the waveform applied to its base terminal. Since transistor Q5 is operated in a saturated mode, the inverted square wave provided at its collector is also somewhat delayed with respect to the square wave signal applied to its base. The inverted and delayed waveform is indicated at VI in FIG. 3.

The waveform (VI) provided at the collector of transistor Q5 is further delayed by a an R-C network comprising a rheostat R16 and a capacitor C9 and this further delayed signal is applied to the base terminal of an NPN transistor Q6. The emitter of transistor Q6 is grounded and its collector provided with a load resistor R17 so that transistor Q6 functions in a common-emitter mode. The waveform provided at the collector of transistor Q6 is inverted and also somewhat additionally delayed with respect to the signal applied to its base terminal. This additionally delayed and inverted signal is represented at VII in FIG. 3.

The square-wave signals provided at the collectors of transistors Q4, Q5 and Q6 (V, VI, VII respectively) are applied to the respective pulse forming circuits indicated at 24, 25 and 26. The three pulse forming circuits are identical to each other and the same reference characters are employed for the component elements of each. The respective square-wave input signal is applied to the base-terminal of an NPN transistor Q9 through a diode D10 and a resistor R20. The biasing of transistor Q9 is determined by the values of the pairs of resistors R21 and R22 connecting the base circuit to positive and negative supply leads respectively. The emitter of transistor Q9 is grounded and its collector is provided with a load resistor R23. Transistor Q9 is operated in a switching mode and the signal provided at its collector is thus inverted and somewhat delayed with respect to the signal applied to its base. Within a certain range, the amount of the delay introduced by transistor Q9 may be adjusted by varying the value of the bias applied thereto.

The respective square-wave input signal supplied to each of the pulse forming circuits 24, 25 and 26 is also applied to one of the two inputs of an AND gate which is indicated generally at 30 and which comprises a pair of diodes D11 and D12. The delayed and inverted signal provided at the collector of transistor Q9 is applied to the other of the inputs. As the two signals applied to the AND-gate 30 are out-of-phase except for the delay introduced by the transistor Q9, it will be understood by those skilled in the art that the output signal from gate 30 is a short pulse which begins with the positive-going edge of the respective square-wave input signal and ends after an interval which results from and is substantially equal to the delay introduced by transistor Q9. The delay introduced by transistor Q9, and hence the duration of the pulse passed by the gate 30, is short in relation to the period of the phase reference signal, i.e., not substantially longer than one-tenth of that period.

The output of the AND gate is applied, through a resistor R24 and a capacitor C10 connected in parallel, to the base terminal of an NPN transistor Q10. The biasing of this transistor is determined by the relative values of a pair of resistors R25 and R26 connecting the base circuit to positive and negative supply leads respectively. The emitter of transistor Q10 is grounded and its collector is provided with a load resistor R28. Transistor Q10 is operated in a saturated common-emitter mode and thus provides at its collector a square-wave signal which is inverted with respect to the signal applied to its base.

The square-wave pulse signals produced at the collectors of the transistors Q10 constitute, as is explained in greater detail hereinafter, sampling pulses which are employed in decoding the subcarrier signal. The durations of these sampling pulses are substantially equal to the durations of the pulses passed by the respective gates 30 and are thus short in relation to the period of the phase reference signal. The sampling pulse signals are represented at VIII, IX and X in FIG. 3 and, as may be seen, each of these signals has a predetermined time or phase relationship to the phase reference signal, which phase relationship depends upon the various delays affecting the timing of the square-wave input signal applied to the respective pulse forming circuits 24, 25 or 26.

The color information or chroma subcarrier is applied to a terminal 32 and from this terminal is applied, through respective coupling capacitors C14, C15 and C16, to the base terminals of three NPN transistors Q14, Q15 and Q16. Transistors Q14, Q15 and Q16 are proerated as linear gates and suitable biasing potentials for this purpose are applied to the base terminals of the transistors through resistors R34–R39. The collector of each of the transistors Q14, Q15 and Q16 is provided with a respective load resistor R44–R46.

The emitter of each of the linear gate transistors Q14–Q16 is connected to the collector of the output transistor Q10 in a respective one of the pulse forming circuits 24–26. The linear gate transistors Q14–Q16 are thus turned on during the short-square-wave sampling pulses generated by the respective pulse forming circuits. When turned on, each of the linear gate transistors Q14–Q16 is operative to effectively sample the instantaneous amplitude of the subcarrier signal applied to its base and to provide at its connector a signal which is representative of the amplitude of the respective sample. Taking into consideration of the delay in which the sampling pulses are formed, it can be seen that each of the linear sampling gates is effectively opened by the positive-going edge of the undelayed square-wave signal provided from the collector of a respective one of the transistors Q4, Q5 and Q6 and is closed by the negative-going edge of the inverted and delayed square-wave signal provided from the collector of a respective one of the transistors Q9.

The pulsating signal provided at the collector of each linear gate transistor Q14–Q16 is filtered in a respective network comprising a respective pair of capacitors C21 and C22, C23 and C24, and C25 and C26 and a respective inductors L1–L3 and the filtered signals are applied to respective output terminals 35, 36 and 37. As is explained in greater detail hereinafter, the averaged value of the samples taken by each linear gate constitutes a respective color signal suitable for use in reproducing the transmitted image by means of a conventional color kinescope.

The operation of the circuit of FIG. 1 is substantially as follows, reference being had to the waveforms illustrated in FIG. 3. At the start of each line of video information, the color burst applied through the transistor Q1 causes the flip-flop circuit 15 to switch to a first state in which it opens the gate 18 allowing the conventionally derived phase reference signal applied at terminal 19 to pass through to the delay, pulse forming and sampling gate circuits. The transistors Q4, Q5 and Q6, together with the associated circuit components, provide respective square-wave signals V, VI and VII having the same frequency as the phase reference signal and different respective phase relationships thereto. The lengths of the various delays which affect the timing of the square-wave signals V, VI and VII are preselected in relation to the frequency of the phase reference signal so that the positive-going edge of each square wave occurs at a phase angle which corresponds to a predetermined hue in the previously described NTSC system of color information modulation.

The square-wave signals V, VI and VII are applied to respective pulse forming circuits 24, 25 and 26 which, as described previously, generate short sampling pulses which are initiated by the leading edge of the respective square-wave signals and which end after a predetermined delay. As also noted previously, the durations of the sampling pulses may be adjusted somewhat by varying the biasing of the respective transistors Q9. The sampling pulses are then employed to open respective linear gates comprising transistors Q14–Q16 so that repeated amplitude samples are taken of the color subcarrier at respective phase angles corresponding to the aforesaid predetermined hues. Since the taking of the samples is sharply and precisely timed in relationship to the phase of the phase reference signal by the switching mode in which the timing and gate circuits are operated and since the sampling periods are short as compared with the period of the phase reference signal, the samples so taken are very precise representations of the amplitude of the subcarrier signal at the respective phase angles. The signal obtained by filtering each such series of samples is then a color signal which is accurately representative of the information impressed upon the subcarrier by the originating source. The use of a short, sharply defined sampling interval also improves the signal-to-noise ratio of the resultant color signal.

As the phase angle of the subcarrier in the NTSC system of transmission is substantially representative of hue and its amplitude is substantially representative of saturation, the demodulation of the subcarrier at preselected phase angles yields color signals which represent the values of individual component colors minus the value of the average luminance, the so-called Y signal. In the example illustrated, the various delays or phase angles are chosen to correspond to the blue, red and green hues so that the signals obtained at the terminals 35, 36 and 37 are the usual B–Y, R–Y, and G–Y signals conventionally employed in displaying color images on a kinescope.

At the end of each scanning line, the horizontal synchronizing pulse applied at terminal 17 causes the flip-flop circuit 15 to switch to its other state thereby shutting or closing the gate 18 and blocking the phase reference signal from the sampling circuits. Thus, during retrace, the linear gate transistors Q14 and Q16 are not activated by the sampling pulses and color blanking is automatically obtained. At the start of the next line of a color transmission, the color burst resets the flip-flop circuit 15 to its first state again allowing the phase reference signal to activate the sampling gate circuitry. It can thus be seen that the phase reference signal is provided to the sampling circuitry on a line-by-line basis only when the color burst signal is present. Since the demodulator operates only when the phase reference signal is provided, it can be seen that no separate color killer circuit is needed for monochrome reception but rather the generation of the B–Y, R–Y and G–Y signals will cease immediately when the color burst signal is omitted from the received signal.

Except for the linear sampling gates, all the active components of the demodulator of FIG. 1 operate in digital or switching modes. Accordingly, a demodulator according to the present invention may be constructed employing binary or digital logic elements of the type which have been highly developed for digital computer use and which are readily adapted for construction in integrated circuit form. In FIG. 2 there is illustrated a digital demodulator constructed using NAND gates as the principal elements thereof. As is understood by those skilled in the art, NAND gates are operative to provide an output signal except when input signals are applied to all of its input circuits. In the case of such a gate having only one input circuit, the gate operates to invert the input signal.

Referring to FIG. 2, a pair of NAND gates G1 and G2 are cross-connected output-to-input to provide a bistable or flip-flop mode of operation which is essentially analogous to the operation of the flip-flop circuit 15 of FIG. 1. The color burst signal (III), supplied to a terminal 51, is applied to the input of the gate G2 for setting the bistable pair to a first state and the horizontal synchronization pulses (II), supplied to a terminal 53, are applied to the input of the other gate G1 to reset the pair to the other of its stable states.

A phase reference signal (IV) is applied to one input of a NAND gate G3, and the output of the gate G2 is applied to another. The gate G3 operates to pass and square the phase reference signal only when the bistable pair G1, G2 is in its aforesaid first state following the application of a color burst signal. The squared phase reference signal passed by gate G3 (V) is applied to a delay network comprising a resistor R60 and a capacitor C40 and the delayed signal, taken from between the resistor and the capacitor, is applied to the input of a NAND gate G4. The output signal from gate G4 (VI) is thus a delayed and inverted function of the output waveform of gate G3. The output signal from gate G4 is, in turn, applied to a delay network comprising a resistor R61 and a capacitor C41 and the further delayed signal is applied to a NAND gate G5. The output signal from gate G5 is thus an inverted and further delayed square-wave signal as represented at VII in FIG. 3.

The square-wave output signals from the gates G3, G4 and G5 are applied to respective pulse forming circuits 57, 58 and 59 each of which includes two NAND gates, G7 and G8, G9 and G10 and G11 and G12 respectively, similarly interconnected. Taking as an example the pulse forming circuit 57, the respective square-wave input signal is applied to the input of the NAND gate G7 which inverts it. The inverted output signal from the gate G7 is also delayed by a respective variable capacitor C47. The resultant inverted and delayed signal is applied to one of the two inputs of the other gate (G8) in the respective pulse forming circuit. The undelayed square-wave signal to the pulse forming circuit is applied to the other of the inputs to gate G8. As the two signals applied to the NAND gate G8 are out-of-phase except for the delay introduced by the capacitor C47, the gate G8 provides an output signal only during the short overlap caused by the delay. The output signals from the gates G8, G10 and G12 can thus be seen to comprise short pulses (VIII, IX, and X) whose durations may be individually adjusted by varying the effective values of the capacitors C47, C49 and C51.

The short output pulses provided by the gates G8, G10 and G12 are employed as sampling pulses to operate sampling gate circuitry indicated generally at 61 which may, for example, be constituted by linear sampling gates such as those illustrated in FIG. 1. The sampling gates, operated under the synchronous control of the pulse wave forms, take repeated samples of the subcarrier signal at respective phase angles corresponding to the timing of the sampling pulses in relation to the phase reference signal. The particular phase angle at which each set of samples is taken may be conveniently preselected by appropriately choosing the values of the delay network components which affect the time of sampling, i.e., the resistors R60 and R61 and capacitors C40 and C41. Similarly, the durations over which the respective samples are taken may be individually adjusted by the setting of the capacitors C47, C49 and C51 which determine the durations of the sampling pulses. As noted previously with reference to FIG. 1, the accuracy with which each sample represents the desired hue may be enhanced by making the sample period relatively short, that is, less than one-tenth of the period of the phase reference signal.

At the end of each scanning line, the horizontal synchronizing pulse resets the bistable pair of gates G1 and G2 to its second or other state. The phase reference signal is thus cut off from the delay and sampling circuitry and color blanking is obtained. Since the phase reference signal is not again provided to the sampling circuitry until a color burst is received, it can be seen that an automatic color killing operation is provided for monochrome reception as in the embodiment of FIG. 1.

While many similarities between the embodiments of FIGS. 1 and 2 have been pointed out in the preceding description, other similarities will be recognized by those skilled in the art by noting that each common-emitter operated transistor in the embodiment of FIG. 1 functions essentially as a single input NAND gate and that multiple-input NAND gate operation is essentially provided by such a transistor cooperating with a plurality of diodes such as the NAND gate 30 employed in the pulse forming circuits of FIG. 1.

In view of the above it will be seen that the several objects of the invention are achieved and other advantageous results attained.

As various changes could be made in the above constructions without departing from the scope of the invention it is intended that all matter contained in the above description or shown in the accompanying drawings shall be interpreted as illustrative and not in a limiting sense.

What is claimed is:

1. In a color television receiver for operation in accordance with a received signal representing successive lines of a scanning raster, which signal includes a subcarrier which represents saturation and which includes also a color burst signal for each raster line; a color signal demodulator comprising:

- means responsive to said color burst signal for providing a square-wave phase reference signal which is initiated by said color burst signal and is phase synchronized therewith and which is terminated after substantially one line period by the subsequent horizontal synchronizing signal; and
- gate means controlled by said phase reference signal for repeatedly sampling said subcarrier in each of a plurality of different preselected phase angles determined with respect to said phase reference signal thereby to provide a respective color signal for each of said phase angles.

2. A demodulator as set forth in claim 1 wherein said means for providing a phase reference signal includes:

- means for providing a continuing phase reference signal which is synchronized with said color burst signal;
- second gate means for selectively passing said continuing phase reference signal;
- means for opening said second gate means in response to the occurrence of a color burst signal in one line; and
- means for closing said second gate means before the time of occurrence of the color burst in the next line.

3. A demodulator as set forth in claim 2 wherein said received signal includes a horizontal synchronizing pulse for each line and wherein said means for closing said second gate means is responsive to said horizontal synchronizing pulses.

4. A demodulator as set forth in claim 1 wherein said received signal includes a horizontal synchronizing pulse and wherein said means for providing a phase reference signal includes:

- a bistable circuit having first and second stable states;
- means responsive to the occurrence of a color burst signal for switching said circuit to its first state;

means responsive to a horizontal synchronizing pulse for switching said circuit to its second state; and means for providing a phase reference signal to said gate means when said bistable circuit is in its first state.

5. In a color television receiver for operation in accordance with a received signal representing successive lines of a scanning raster, which signal includes a subcarrier the phase of which represents hue and the amplitude of which represents saturation and which includes also a color burst signal for each raster line; a color signal demodulator comprising:

means for providing a phase reference signal having a predetermined phase relationship to said color burst signal;

first, second and third means for generating first, second, and third pulse signals respectively, each of said signals comprises a series of sampling pulses which are substantially shorter than the period of said phase reference signal and occur at predetermined phase angles with respect to said phase reference signal;

first, second, and third gate means controlled respectively by said first, second, and third pulse signals for taking amplitude samples of said subcarrier during the respective pulses; and first, second, and third filter means for averaging the samples taken by said first, second, and third gate means respectively thereby to provide first, second, and third color signals which represent hues corresponding to the phase angles at which the respective samples were taken.

6. A demodulator as set forth in claim 5 wherein said means for providing a phase reference signal is responsive to said color burst signal and provides a squarewave phase reference signal which is initiated by said color burst signal and which ends after substantially one line period.

7. A demodulator as set forth in claim 5 wherein said first, second, and third means for generating said first, second and third pulse signals each comprises means for delaying an input signal applied thereto and gate means responsive to the delayed and undelayed input signals for providing an output pulse having a duration substantially equal to the delay.

8. A demodulator as set forth in claim 5 wherein said first, second, and third gate means comprise linear amplitude sampling gates.

9. A demodulator as set forth in claim 8 wherein each of said linear sampling gates comprises a transistor, means for applying said subcarrier to the base of said transistor and means for applying the respective pulse signal to the emitter of said transistor.

10. In a color television receiver for operation in accordance with a received signal which includes a subcarrier the phase of which represents hue and the amplitude of which represents saturation and which includes also a color burst signal for each raster line; a color signal demodulator comprising:

means for providing a square wave phase reference signal of a predetermined frequency, said means being initiated by the color burst signal and terminated by the subsequent horizontal synchronizing pulse;

a plurality of sampling gates each of which, when opened, is operative to pass a sample of said subcarrier signal;

respective means for opening each of said gates at a respective predetermined phase angle within each cycle of said phase reference signal;

respective means for closing each of said gates after a predetermined time delay following its opening, said delay being not substantially larger than one-tenth of the period of said phase reference signal; and respective means for averaging the samples of said subcarrier signal taken by each of said gates thereby to provide respective color signals each of which represents a predetermined hue corresponding to the phase angle at which the respective samples were taken.

11. A demodulator as set forth in claim 10 wherein each of said respective gate opening means includes means for providing a square-wave signal having a predetermined phase relationship to said phase reference signal;

wherein each of said respective gate closing means includes means for delaying the square-wave signal provided by the respective gate opening means; and wherein each of said sampling gates is controlled by a two input gate which is responsive to the respective delayed and undelayed square-wave signals for opening the respective sampling gate only during the overlap between the respective delayed and undelayed signals.

12. In a color television receiver for operation in accordance with a received signal which includes a subcarrier the phase of which represents hue and the amplitude of which represents saturation and which includes also a phase reference signal; a color signal demodulator comprising:

means for providing first, second, and third square-wave signals having respective predetermined phase relationships to said phase reference signal;

respective means for delaying each of said first, second, and third square-wave signals to provide respective first, second, and third delayed signals, the delays provided by said respective means being substantially shorter than the period of said phase reference signal;

first, second, and third gate means responsive respectively to said first square-wave and said first delayed signals and said second square-wave and said second delayed signals and said third square-wave and said third delayed signals for providing first, second, and third sample pulses; and first, second, and third linear gate means controlled respectively by said first, second, and third sample pulses for taking samples of said subcarrier at respective phase angles thereby to provide respective color signals each of which represents a respective predetermined hue corresponding to the phase angle at which the respective samples were taken.

13. A demodulator as set forth in claim 12 wherein said respective means for delaying said square-wave signals include means for inverting said square-wave signals and wherein said gate means for providing sample pulses comprise NAND gates.

References Cited

UNITED STATES PATENTS

| | | | |
|---|---|---|---|
| 2,153,178 | 4/1939 | Fitch. | |
| 2,718,546 | 9/1955 | Schlesinger. | |
| 2,824,172 | 2/1958 | Cherry. | |
| 3,243,707 | 3/1966 | Cottrell | 329—50 |

RICHARD MURRAY, Primary Examiner

R. L. RICHARDSON, Assistant Examiner

U.S. Cl. X.R.

329—50